(No Model.)

J. C. BROWN.
BUTTER PACKAGE.

No. 296,821. Patented Apr. 15, 1884.

WITNESSES:
Donn Twitchell
C. Sedgwick

INVENTOR:
J. C. Brown
BY Munn & Co
ATTORNEYS.

UNITED STATES PATENT OFFICE.

JOHN C. BROWN, OF DAVENPORT CENTRE, NEW YORK.

BUTTER-PACKAGE.

SPECIFICATION forming part of Letters Patent No. 296,821, dated April 15, 1884.

Application filed August 20, 1883. (No model.)

*To all whom it may concern:*

Be it known that I, JOHN C. BROWN, of Davenport Centre, in the county of Delaware and State of New York, have invented a new and Improved Butter-Package, of which the following is a full, clear, and exact description.

The object of my invention is to provide a new and improved butter-package which is sealed air-tight, and from which the cover can be removed when desired, which package is provided with a handle, forming part of the fastening.

Reference is to be had to the accompanying drawings, forming part of this specification, in which similar letters of reference indicate corresponding parts in all the figures.

Figure 1:
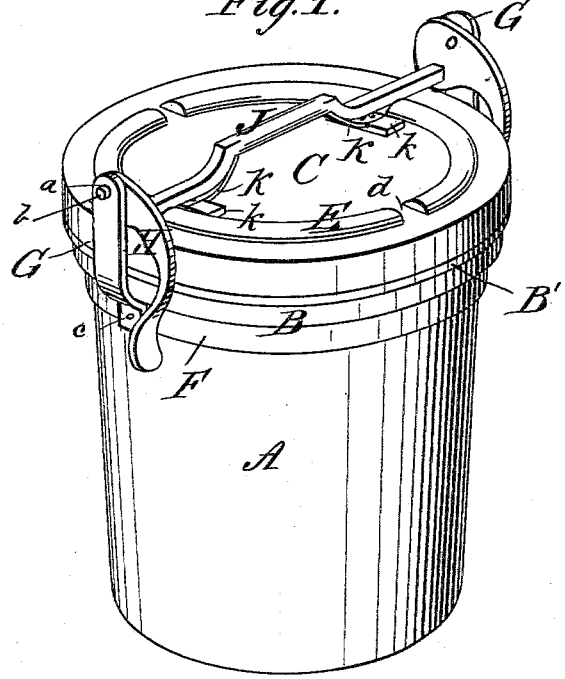
Figure 2:
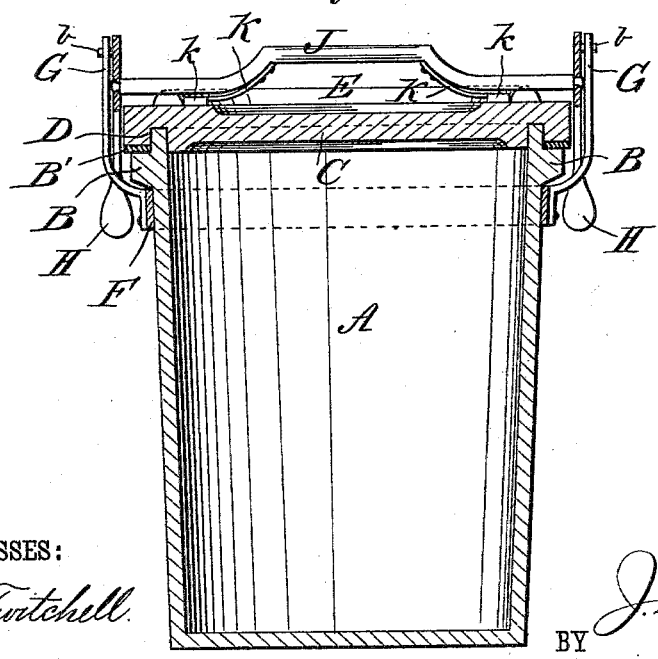

Figure 1 is a perspective view of my improved butter-package. Fig. 2 is a longitudinal sectional elevation of the same.

The butter tub or pail A, which is made of glass or any other suitable material, is provided with an annular ridge, B, a short distance from its upper edge, and the cover C is provided on its under surface with an annular groove, D, for receiving that part of the jar or tub projecting above the annular ridge B. A rubber packing-ring, B', rests upon the said ridge and closes the jar air-tight. The top of the cover is recessed at the middle, and around the recessed part it is provided with a raised ridge, E, having a series of diametrically opposite notches, d. A ring, F, surrounds the jar directly below the ridge B, and from the said ring F two ears, G, diametrically-opposite each other and provided with journal-bearings a, project upward, in each of which a cam-lever, H, is held by a stud projecting from the cam-lever into the aperture a in the ear, in which levers a bent cross-piece, J, is pivoted, which serves as a handle for the jar, the said cross-piece being bent to project upward in the middle, whereas the ends are arranged to rest on the cover. The ears G are each pivoted to the ring F by a rivet, e.

On the cross-piece J spring-strips K are fastened, to prevent the cross-piece from revolving or turning, and to give a uniform and easy pressure on the cover C. For the purpose of making a broader bearing for the springs K, short pieces k may be secured upon the free ends of said springs. The cover is placed on the jar, the cam-levers H being turned upward and the cross-piece J held above the cover C. Then the cam-levers H are pressed downward, and thereby press the cross-piece J on the cover C, the ends of the cross-piece passing into the notches d and preventing the cover from turning. The cover is pressed very firmly on the upper edge of the jar and on the packing-ring B', and the jar is thus closed tightly, and at the same time is provided with a handle. The cover can be removed from or replaced on the jar very easily and rapidly.

In practice the cover is locked to the jar by turning down the cam-levers H, the ears G turning on their pivotal points e, and moving toward the levers during the downward movement of the latter until the studs a, pass the central line of the handle J or the vertical central lines of the ears, thus effectually locking the cover in place, and the weight of the vessel, in carrying it by its handle, will more effectually secure the cover in place.

Having thus described my invention, what I claim as new, and desire to secure by Letters Patent, is—

1. In a butter-package, the combination, with a jar and its cover, of a ring surrounding the jar, ears projecting from the same, cam-levers held to turn on the ears, and a cross-piece pivoted to the cam-levers and bent at its middle to form a handle-loop, substantially as herein shown and described.

2. The combination, with a butter-jar, of a cover having an annular ridge on its upper surface, which ridge is provided with a series of diametrically-opposite notches, ears projecting from the ring surrounding the jar, cam-levers held to turn on the said ears, and a cross-piece pivoted in the cam-levers, substantially as herein shown and described.

3. In a butter-package, the combination, with a jar and its cover, of cam-levers held to turn on ears held on the jar, and a cross-piece pivoted to the cam-levers, to which cross-piece spring-plates K are fastened, substantially as herein shown and described.

4. The combination, with a jar and its cover, of a ring, F, ears G, pivoted to said ring, cam-levers H, journaled in the ears, and a cross-bar journaled in the cam-levers, and serving the double purpose of a handle and means for holding the cover, substantially as described.

JOHN C. BROWN.

Witnesses:
  JAMES PINDAR,
  CHAS. D. MORELL.